United States Patent [19]

Laschober

[11] Patent Number: 4,930,885
[45] Date of Patent: Jun. 5, 1990

[54] EYEGLASSES WITH RELEASABLE HEADBAND SUPPORT ARRANGEMENT

[76] Inventor: Brian J. Laschober, 17259 Oleander, Tinely Park, Ill. 60477

[21] Appl. No.: 244,266

[22] Filed: Sep. 14, 1988

[51] Int. Cl.⁵ ............................ G02C 3/00; A61F 9/02
[52] U.S. Cl. .................................. 351/156; 351/157; 2/452
[58] Field of Search ............... 2/452; 351/156, 157, 351/121, 140, 158

[56] References Cited

U.S. PATENT DOCUMENTS

| | | | |
|---|---|---|---|
| 2,660,092 | 11/1953 | Bloom | 351/156 |
| 3,173,147 | 3/1965 | Gross et al. | 351/156 |
| 3,475,084 | 10/1969 | Gil et al. | 351/116 |
| 3,582,194 | 6/1971 | Liautaud | 351/156 |
| 3,728,012 | 4/1973 | Downey | 351/157 |
| 4,129,362 | 12/1978 | Lorenzo | 351/123 |
| 4,133,604 | 1/1979 | Fuller | 351/123 |
| 4,152,051 | 5/1979 | Van Tiem et al. | 351/59 |
| 4,541,696 | 9/1985 | Winger et al. | 351/123 |
| 4,549,793 | 10/1985 | Yoon | 351/156 |

Primary Examiner—P. M. Dzierzynski
Attorney, Agent, or Firm—Lee, Mann, Smith, McWilliams & Sweeney

[57] ABSTRACT

Eyeglasses with a releasable support headband arrangement including a frame provided at each side with an integral connector member extending therefrom. An attachment member adapted for releasable securement to each connector member is releasably securable to each end of a stretchable headband, the headband supporting the eyeglasses on the wearer's head.

3 Claims, 2 Drawing Sheets

U.S. Patent Jun. 5, 1990 Sheet 1 of 2 4,930,885
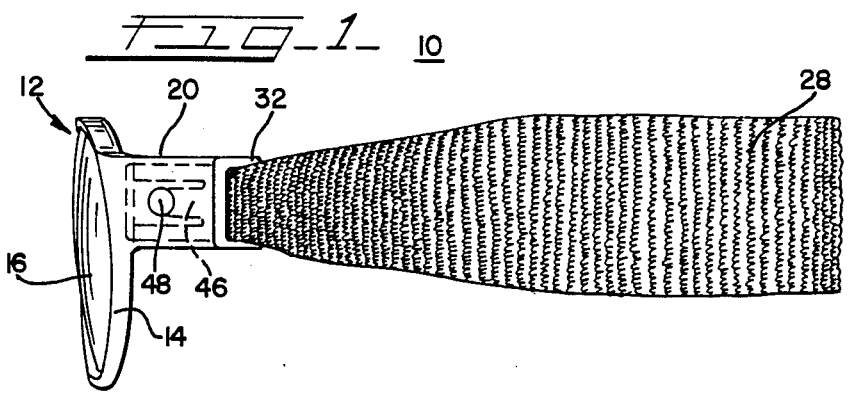
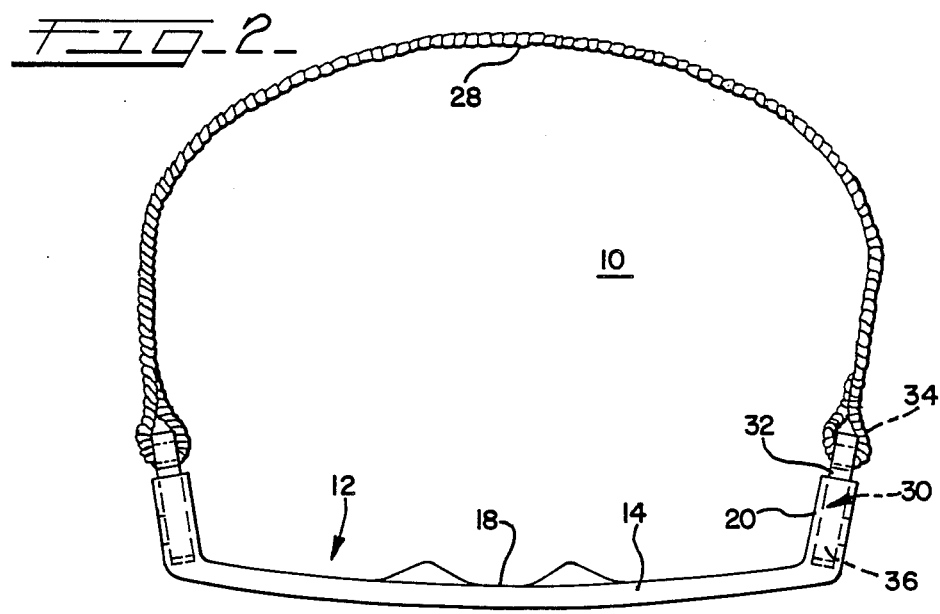
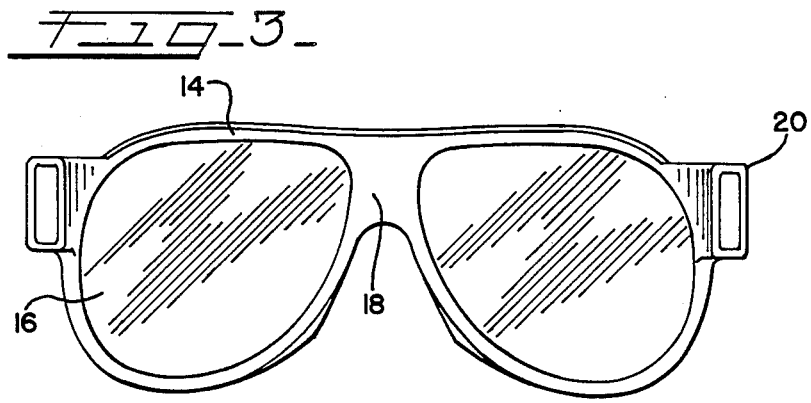

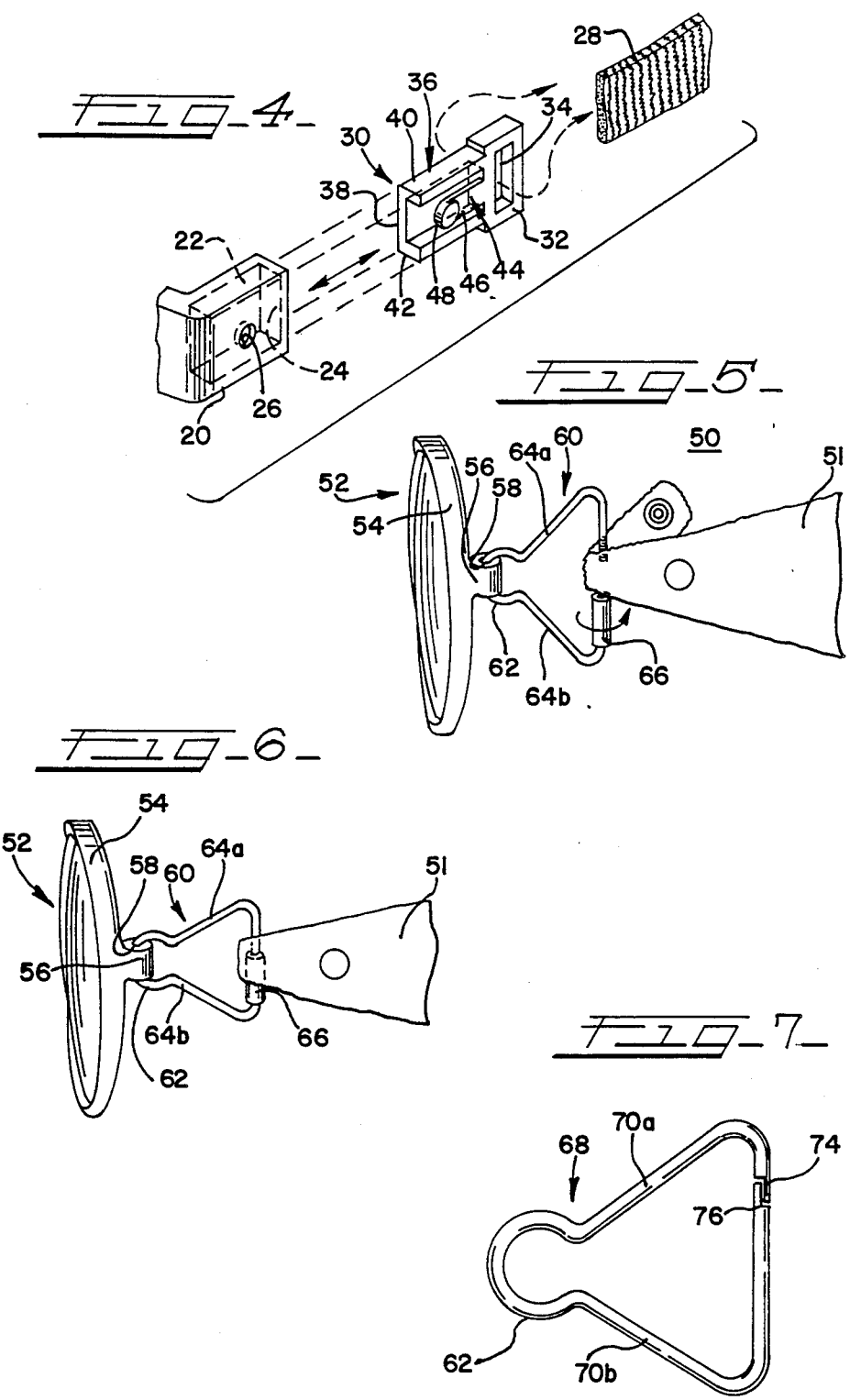

4,930,885

EYEGLASSES WITH RELEASABLE HEADBAND SUPPORT ARRANGEMENT

BACKGROUND OF THE INVENTION

The present invention relates to a eyeglass frame support arrangement. More particularly, it relates to a stretchable headband releasably securable to the eyeglass frame to replace temple bows as supports. Eyeglass frame support arrangements are shown in U.S. Pat. Nos. 3,475,084, 3,582,194, 3,728,012, 4,129,362, 4,133,604, 4,152,051, 4,541,696 and 4,549,793. None of these patents discloses the features of the present invention.

SUMMARY OF THE INVENTION

The present invention provides a releasable headband support arrangement for eyeglasses. The arrangement includes eyeglasses having a frame for supporting a pair of lenses, the frame provided at each side with an integral connection member extending therefrom. A stretchable headband is releasably securable to the eyeglass frame by means of attachment means releasably securable to the eyeglass frame connector means. The headband resiliently supports the eyeglass frame on the wearer's head, thereby eliminating temple bows. The headband may be readily attached to and detached from the eyeglass frame for easy interchangeability.

BRIEF DESCRIPTION OF THE DRAWINGS

FIG. 1 is a side elevational view of the preferred embodiment of the present invention.

FIG. 2 is a top view of the glasses and headband arrangement of FIG. 1.

FIG. 3 is a rear view of the glasses of FIG. 1 with the headband removed.

FIG. 4 is a partial exploded perspective view of the headband, attachment member and connector member of the preferred embodiment shown in FIG. 1.

FIG. 5 is a partial side view of an alternate embodiment.

FIG. 6 is a side view of the glasses and headband arrangement of FIG. 5 with the headband secured to the frame.

FIG. 7 is a side view of a modified attachment member.

DETAILED DESCRIPTION OF THE INVENTION

The preferred embodiment of a releasable headband arrangement for securing eyeglasses to the head of a wearer, generally designated by the numeral 10, is shown in FIGS. 1-4. The arrangement 10 includes a pair of eyeglasses 12 having a frame 14 for supporting a pair of lenses 16 connected by a bridge 18 to support the frame 14 on a wearer's nose. The lenses 16 may be any type of lenses, including prescription lenses or sun protection lenses.

The frame 14 is provided at each side with an integral connector member 20 which extends rearwardly therefrom. The connector member 20 is substantially rectangular-shaped and defines therein a recess 22 having an opening 24 in the rear wall of the connector member 20. A generally circular aperture 26 is defined in the outer side wall of the connector member 20.

A stretchable headband 28 having a pair of free ends is adapted for releasable securement to the frame 14, so that the eyeglasses are supported in position about the wearer's head thereby, thus eliminating temple bows. This enables an eyeglass wearer to select any of a number of different colored headbands, with or without printed legends or decorative design, so as to coordinate the headband with the outfit or motif the wearer desires.

Each free end of the headband 28 may be secured to an attachment member 30 which is adapted for releasable securement within a connector member recess 22 as shown in FIG. 4. The rear portion 32 of the attachment member 30 is substantially rectangular and defines a slot 34 therethrough adapted to receive a free end of the headband 28. The free end is inserted through the slot 34 and folded back, as indicated in FIG. 4, then fastened to the headband 28 by means of a snap arrangement or Velcro ® arrangement or other suitable means provided on the headband 28.

The front portion 36 of the attachment member 30 extends laterally outwardly from the rear portion 32 and includes an inner side wall 38, a top wall 40 and a bottom wall 42. Extending laterally outwardly from the rear portion 32 of the attachment member 30 in opposing and parallel relation to the inner side wall of the front portion 36 is a resilient snap-lock member 44. The snap-lock member 44 consists of a resiliently mounted arm 46 and a generally circular-shaped tab 48 adapted to be received in the aperture 26 defined through the outer side wall of the connector member 20.

The headband 28 may be secured to the frame 14, as shown in FIG. 4, by inserting the front portion 36 of the attachment member 30 into the respective connector member recess 22. As the attachment member 30 is slid inwardly into the recess 22, the tab 48 contacts the inner surface of the outer side wall of the connector member 20 causing the resilient arm 46 to bias inwardly. However, when the tab 48 engages the aperture 26, the arm 46 snaps back to its normal position, thereby locking the tab 48 in the aperture 26 and securing the attachment member 30 to the connector member 20. To release the attachment member 30 from the connector member 20, the tab 48 is pressed inwardly while the attachment member 30 is pulled outwardly from the connector member recess 22.

An alternate embodiment, generally indicated by the numeral 50, is shown in FIGS. 5 and 6. This embodiment includes a stretchable headband 51 adapted for use with a conventional pair of eyeglasses or sunglasses. The frame 54 has an integral connector member 56 extending rearwardly from each side. The connector members 56 are generally cylindrical-shaped and each defines a longitudinally-extending bore 58 therethrough. Ordinarily one end of a temple bow is attached to each connector member 56 by means of a hinge screw. The other ends of the temple bows rest atop the wearer's ears to support the eyeglasses. As seen in FIGS. 5 and 6, the conventional frame 54 is incorporated in that embodiment. However, the hinge screws and temple bows are removed and set aside.

An attachment member 60 is provided to releasably secure the headband 51 to the frame 54. Each attachment member 60 is made of a single piece of resilient tubing, wire or like material and has a generally triangular-shaped configuration. The attachment member 60 comprises a loop portion 62, open at one end, adapted for securement to connector member 56. A pair of diverging arms 64a and 64b extends from the open end of the loop portion 62. The upper arm 64a is bent downwardly, as seen in FIG. 5. The free end is threaded and is sized to be inserted through the bore 58 in the connector member 56. The lower arm 64b is bent upwardly and is provided with a rotatable, internally threaded sleeve 66 at the free end.

The headband 51 is secured to the frame 54 by inserting the threaded end of each upper arm 64a through the respective bore 58 in a connector member 56 so that it extends outwardly the top thereof. The upper arm 64a is then pulled completely through the bore 58 so that the loop portion 62 of the attachment member 60 is retained therein. The attachment member 60 may be attached through the bore 58 with relative ease because of its resilient construction. The sleeve 66 on each lower arm 64b is threaded onto the upper arm 64a to secure the attachment member 60 to the connector member 56. The free ends of the headband 28 are secured about the now connected free ends of the attachment member 60 in the same manner as described above for the preferred embodiment, thereby connecting the headband 51 to the frame 54.

FIG. 7 shows a variation 68 of the attachment member 60 illustrated in FIGS. 5 and 6. In the attachment member 68, the downwardly-extending, bent-over free end of the upper arm 70a is substantially shorter than the upwardly-extending, bent-over free end of the lower arm 70b. The free end of the upper arm 70a, instead of being threaded, defines a notch 74. Likewise, the free end of the lower arm 70b is not provided with the sleeve 60, but with a corresponding notch 76. The varied attachment member 68 normally assumes the position shown in FIG. 7, whereby the corresponding notches 74, 76 are positioned in interconnected relation.

When it is desired to secure the attachment member 68 to the connector member 56, one of the arms 70, because of the resilient construction of the attachment member 68, may be moved laterally so that the notches 74, 76 are not positioned in interconnected relation. The free end of the upper arm 70a is then inserted through the lower end of the connector member bore 58 so that it extends beyond the upper end thereof. The upper arm 70a is pulled completely through the bore 58 so that the loop portion 62 is retained therein. The arms 70 are then returned to the interconnected position shown in FIG. 7 and the free ends of the headband 51 secured thereabout, thereby securing the headband 51 to the frame 54.

The above described embodiments replace temple bows as a means for supporting glasses on a wearer's head. One advantage of these arrangements is that the headband securely retains the glasses to the wearer's head even when he is engaged in a sporting or other rigorous activity wherein the glasses may ordinarily slip off and be damaged. Another advantage is that the attachment members are easily attachable to and detachable from the connector members of the frames and the headband is easily attachable to and detachable from the attachment members. This allows the wearer to alternate or mix and match headbands and attachment members of different colors, patterns or other motifs.

Thus it has been shown that the present invention provides a removable headband support arrangement for eyeglasses to support and retain the eyeglasses on the head of the wearer without the use of temple bows.

Various features of this invention have been particularly shown and described in connection with the illustrated embodiment of the invention. However, it must be understood that these particular arrangements merely illustrate and that the invention is to be given its fullest interpretation within the terms of the appended claims.

What is claimed is:

1. A pair of eyeglasses including a frame for supporting a pair of lenses, said frame provided at each side with an integral connector member extending rearwardly from said frame, said connector member defining a recess having a pair of side walls and an opening at the rear thereof, one of said side walls defining an aperture therethrough; a pair of attachment members, each adapted for releasable securement with said respective connector member; one end of each said attachment member provided with a slot therethrough and the other end of each said attachment member adapted for insertion into said recess and provided with a resilient lock member adapted to cooperate with said aperture in said one side wall to releasably secure said attachment member within said recess of said connector member; a stretchable headband, each end of which is securable within one said slot of said attachment member, said headband adapted to secure said eyeglasses on the head of a wearer, thereby eliminating temple bows; wherein said headband may be readily attached to and disconnected from said frame of said eyeglasses.

2. A readily releasable and attachable headband arrangement for supporting an eyeglass frame to the head of a wearer including a stretchable headband having a pair of ends; an attachment member positioned at each end of said headband including a releasable clip specially adapted to readily attach to and release from an integral corresponding connector extending rearwardly from each side of said eyeglass frame; said attachment member including at one end a slot adapted to receive for releasable securement one end of said headband and the other end of each said attachment member provided with a resilient lock member adapted to cooperate with said corresponding connector member to releasably secure said attachment member within said connector member thereby releasably securing said headband to said eyeglass frame; wherein said headband resiliently supports said eyeglass frame in position on the wearer's head thereby eliminating temple bows.

3. A pair of eyeglasses including a frame for supporting a pair of lenses, said frame provided at each side with an integral connector member extending rearwardly from said frame, said connector member defining a longitudinally extending, generally cylindrical recess therethrough, said recess defining openings at the top and base of said connector member; a pair of attachment members each adapted for releasable securement through said openings of said respective connector member, each said attachment member including an end portion adapted to be disposed within said recess, said end portion defining a pair of diverging arms having free ends which are releasably securable to one another to define a support arm; a stretchable headband having a pair of ends, each end releasably securable to said support arm of said respective attachment member, said headband adapted to secure said eyeglasses on the head of a wearer, thereby eliminating temple bows; wherein said headband may be readily attached to and disconnected from said frame of said eyeglasses.

* * * * *